(12) United States Patent
Sasaki et al.

(10) Patent No.: US 6,204,470 B1
(45) Date of Patent: Mar. 20, 2001

(54) LASER PROCESSING APPARATUS

(75) Inventors: Haruki Sasaki; Kouji Kawamura, both of Chiba-ken (JP)

(73) Assignee: Miyachi Technos Corporation, Chiba-Ken (JP)

( * ) Notice: Subject to any disclaimer, the term of this patent is extended or adjusted under 35 U.S.C. 154(b) by 0 days.

(21) Appl. No.: 09/312,055

(22) Filed: May 17, 1999

(30) Foreign Application Priority Data

May 18, 1998 (JP) .................................................. 10-153550

(51) Int. Cl.[7] .................................................. B23K 26/00
(52) U.S. Cl. ........................................ 219/121.61; 372/38
(58) Field of Search ........................... 219/121.6, 121.61, 219/121.62; 700/166; 372/8, 109, 25, 29, 33, 38

(56) References Cited

U.S. PATENT DOCUMENTS

| | | | |
|---|---|---|---|
| 4,812,641 | * | 3/1989 | Ortiz, Jr. .......................... 219/121.62 |
| 5,283,794 | * | 2/1994 | Gibbs et al. ............................... 372/8 |
| 5,575,935 | * | 11/1996 | Nakata ............................. 219/121.61 |
| 5,589,089 | * | 12/1996 | Uesugi ............................... 219/121.6 |
| 5,798,867 | * | 8/1998 | Uchida et al. . | |
| 5,999,549 | * | 12/1999 | Freitag et al. .......................... 372/29 |

FOREIGN PATENT DOCUMENTS 11-254159 * 9/1999 (JP) .

* cited by examiner

*Primary Examiner*—Geoffrey S. Evans
(74) *Attorney, Agent, or Firm*—Wenderoth, Lind & Ponack, LLP.

(57) ABSTRACT

A laser processing apparatus in which a laser beam oscillatory output from a laser oscillation unit is transmitted through an optical fiber to a remote laser processing site, where the laser processing apparatus has an optical fiber setting apparatus for finding a supply power upper limit for the type of fiber (including a step index (SI) fiber and a graded index (GI) fiber) used and the diameter of the optical fiber, and a laser power supply unit for supplying the laser oscillation unit with an electric power for laser oscillation. A supply power mean value arithmetic apparatus detects the electric power supplied to the laser oscillation unit to figure out a supply power mean value at a certain interval, and the laser power supply unit is interrupted when the supply power mean value exceeds the supply power upper limit.

18 Claims, 18 Drawing Sheets

[STATUS SCREEN]

```
-STATUS  [PANEL CONTROL]        WATER 28 °C
 BEAM-1:OFF   RESET SELECT       PRESET
 BEAM-2:OFF  →SHOT  123456789   123456789
 BEAM-3:OFF  →GOOD  123456789   123456789
 BEAM-4:OFF         CONTROL: LASER POWER
                    POSITION BLINK:OFF
                    FIBER: SI  φ 0.0mm
 HV:OFF  MAIN SHUTTER:OFF  POSITION:OFF
```

FIG.10

[ LASER OUTPUT UPPER LIMITS ]

| TYPE<br>DIAMETER<br>$\phi\,(\mu m)$ | STEP INDEX<br>(S I) | GRADED INDEX<br>(G I) |
|---|---|---|
| 200 | $P_a$ | $P_A$ |
| 400 | $P_b$ | $P_B$ |
| 600 | $P_c$ | $P_C$ |
| 800 | $P_d$ | $P_D$ |
| 1000 | $P_e$ | $P_E$ |

FIG.11

[ LAMP POWER UPPER LIMITS ]

| TYPE<br>DIAMETER<br>$\phi\,(\mu m)$ | STEP INDEX<br>(S I) | GRADED INDEX<br>(G I) |
|---|---|---|
| 200 | $Q_a$ | $Q_A$ |
| 400 | $Q_b$ | $Q_B$ |
| 600 | $Q_c$ | $Q_C$ |
| 800 | $Q_d$ | $Q_D$ |
| 1000 | $Q_e$ | $Q_E$ |

[POWER MONITOR SCREEN]

[SCHEDULE SCREEN] (FIX MODE)

```
-SCH.#03  [FORM:FIX] ≃ 20.0J  WATER 28°C
∠:OFF    PEAK=10.00kW    REPEAT=500pps
↑ SLOPE 01.0ms            SHOT   =9999
 FLASH1 01.0ms 100.0%  HIGH  999.9J
 FLASH2 01.5ms 025.0%  LOW   000.0J
 FLASH3 03.0ms 050.0%
↓ SLOPE 01.0ms
 HV:OFF   MAIN SHUTTER:OFF   POSITION:OFF
```

(GRAPH OFF)

↕

(GRAPH ON)

FIG.18

```
!!!TROUBLE!!!              WATER 29°C
E44:SET ERROR(FIBER)

HV:ON    MAIN SHUTTER:ON    POSITION:OFF
```

FIG.19

```
!!!TROUBLE!!!              WATER 29°C
E48:OVER RATE(FIBER)

HV:ON    MAIN SHUTTER:ON    POSITION:OFF
```

[ SCHEDULE SCREEN ] (FLEX MODE)

```
-SCH.#00  [FORM:FLEX]~20.0J  WATER 28°C
⊢:OFF    PEAK=10.00kW    REPEAT=500pps
▲POINT 1  05.0ms  090.0%  SHOT  =9999
 POINT 2  07.0ms  070.0%  HIGH  999.9J
 POINT 3  12.0ms  088.0%  LOW   000.0J
 POINT 4  15.0ms  068.0%
▼POINT 5  18.0ms  000.0%
 HV:OFF   MAIN SHUTTER:OFF   POSITION:OFF
```

( GRAPH OFF )

( GRAPH ON )

```
-SCH.#00  [FORM:FLEX] ~20.0J  WATER 28°C
⊢:ON     PEAK=10.00kW    %
▲POINT 1  05.0ms  090.0%
 POINT 2  07.0ms  070.0%
 POINT 3  12.0ms  088.0%
 POINT 4  15.0ms  068.0%
▼POINT 5  18.0ms  000.0%                    mS
 HV:OFF   MAIN SHUTTER:OFF   POSITION:OFF
```

LASER PROCESSING APPARATUS

BACKGROUND OF THE INVENTION

1. Field of the Invention

The present invention relates to an optical fiber transmission-type laser processing apparatus.

2. Description of the Related Arts

In case of performing a laser processing at a site remote from the body using a laser processing apparatus such as a YAG laser, an input unit within the apparatus body is linked via an optical fiber with an output unit at remote site (processing site). A laser beam generated in the apparatus body is transmitted from the input unit through the optical fiber to the output unit, where the laser beam is projected onto a workpiece.

Recently prevailing is a multi-position processing in which a laser beam oscillated within the apparatus body is branched into a plurality of laser beams, which are then directed via optical fibers toward different positions.

A laser processing apparatus generating a pulsed laser beam to perform the laser processing has hitherto used a technique for variably controlling waveforms of a laser output of the pulsed laser beam or of predetermined electric parameters corresponding thereto, so as to be adaptable to a diversity of processing demands.

According to such a waveform control system, a desired reference waveform for waveform control is previously set and entered into the laser processing apparatus. In the laser processing apparatus, a laser oscillation unit is supplied with a power from a laser power supply unit to oscillatorily output a laser beam, and a laser control part controls the laser power supply unit with an open loop control system or a closed loop (feedback) control system so as to allow waveforms, that is, variations with time of the laser output of the laser beam oscillatorily output from the laser oscillation unit or of predetermined electric parameters of the laser power supply unit to conform to that reference waveform.

In case of the laser processing using the pulsed laser beam, typically a series of pulsed laser beams are irradiated to the workpiece at a preset repetition frequency.

In the optical fiber transmission-type laser processing apparatus as described above, the laser beam must impinge correctly on one end surface of the optical fiber (in other words, it must be concentrated onto the central portion of the end surface) in the input unit of the apparatus body. Inaccurate incidence of the laser beam on the optical fiber results in a greater loss of laser output or in burning of the end surface of the optical fiber. Thus, in the input unit, upon the assembling or setting of the apparatus or upon the exchange of the optical fibers, the position of a condenser lens is adjusted (focused) in the optical axis direction (Z direction) while simultaneously the attachment position of the optical fiber is adjusted (optical axis aligned) in the direction (XY direction) orthogonal to the optical axis direction.

In this type of laser processing apparatus, however, if the laser output exceeds a certain value, the thermal lens effect or the like of the laser medium (YAG rod) may possibly cause as shown in FIG. 22 an enlarged beam diameter or output angle as indicated by a dotted line LB' of the laser beam LB oscillated from the laser oscillation unit 200, with the result that the laser beam overfill the incidence end surface of the optical fiber 204 even though it is condensed by the condenser lens 202 in the input unit, consequently bringing about a possible burning of the optical fiber 204 or defective processing. The limit value of the laser output causing such a deficiency depends on the type and diameter of the optical fiber.

For this reason, in the multi-position processing system, any change in the type or diameter of the fibers due to the replacement of the optical fibers may result in a change of upper limit of the laser output for the optical fibers. Therefore, even though it has been normal so far, the upper limit may be exceeded after the exchange, resulting in a damage of the optical fibers.

Furthermore, in the waveform-controlled laser processing apparatus, the user (operator) can set the pulse waveform and the pulse repetition frequency of the pulsed laser beam to any values. As a result, there may possibly be made such a setting as to exceed the laser output limit value for the optical fiber.

SUMMARY OF THE INVENTION

The present invention was conceived in view of the above problems involved in the prior art. It is therefore the object to provide a laser processing apparatus capable of automatically managing an incident (injecting) power of a laser beam on the optical fiber without any user's labor and burden, thereby achieving improvements in the protection of the optical fiber, the laser processing efficiency and process quality.

In order to attain the above object, according to a first aspect of the present invention, there is provided a laser processing apparatus in which a laser beam oscillatorily output from a laser oscillation unit is transmitted through an optical fiber to a remote laser processing site, the laser processing apparatus comprising optical fiber setting means for setting the type and diameter of the optical fiber; laser output upper limit finding means for finding a laser output upper limit of the laser beam depending on the type and diameter of the optical fiber which have been set by the optical fiber setting means; laser output setting means for setting a laser output of the laser beam; and judgment means for comparing the laser output value which has been set by the laser output setting means with the laser output upper limit which has been found by the laser output upper limit finding means, to judge whether the laser output set value exceeds the laser output upper limit.

The laser output upper limit finding means may include storage means for storing in a table format the type and diameter of a plurality of optical fibers usable for the apparatus, and laser output upper limits corresponding to each type and diameter.

The laser output setting means preferably include reference waveform setting means for setting a reference waveform for laser output reference waveform with respect to the laser beam generated as a pulsed laser beam; repetition frequency setting means for setting a repetition frequency with respect to the laser beam; and laser output mean value arithmetic means for figuring out as the laser output set value a laser output mean value of the pulsed laser beam per a certain time on the basis of the reference waveform which has been set and of the repetition frequency which has been set.

The laser output setting means may include laser output set value arithmetic means for figuring out the laser output set value on the basis of a pulse width, a peak power value and a repetition frequency of the laser beam which has been generated as a pulsed laser beam.

Preferably the laser processing apparatus further comprises warning means for generating a warning when the judgment means judge that the laser output set value exceeds the laser output upper limit.

Preferably the laser processing apparatus further comprises means which prohibit the setting in the laser output setting means when the judgment means judge that the laser output set value exceeds the laser output upper limit.

According to a second aspect of the present invention there is provided a laser processing apparatus in which a laser beam oscillatorily output from a laser oscillation unit is transmitted through an optical fiber to a remote laser processing site, the laser processing apparatus comprising laser output upper limit finding means for finding a laser output upper limit of the laser beam depending on the type and diameter of the optical fiber; laser output mean value arithmetic means for detecting a laser output of the laser beam oscillatorily output from the laser oscillation unit to figure out a laser output mean value at a certain interval; and interruption means for interrupting an impingement of the laser beam onto the optical fiber when the laser output average value exceeds the laser output upper limit.

According to a third aspect of the present invention there is provided a laser processing apparatus in which a laser beam oscillatorily output from a laser oscillation unit is transmitted through an optical fiber to a remote laser processing site, the laser processing apparatus comprising a laser power supply unit for supplying the laser oscillation unit with a power for laser oscillation; supply power upper limit finding means for finding a supply power upper limit of the laser power supply unit corresponding to the laser output upper limit of the laser beam depending on the type and diameter of the optical fiber; supply power mean value arithmetic means for detecting a power supplied by the laser power supply unit to the laser oscillation unit to figure out a supply power mean value at a certain interval; and interruption means for interrupting the laser power supply unit when the supply power mean value exceeds the supply power upper limit.

According to the laser processing apparatus of the present invention, depending on the type and diameter of the optical fiber which is set (in use) the laser output upper limit for that optical fiber is found, and the set laser output value or the actual laser output value is compared with that laser output upper limit to judge whether the laser output value is proper or not for that optical fiber, whereby it is possible to realize improvements in the optical fiber protection, laser processing efficiency and process quality with no need for the user's labor and burden.

BRIEF DESCRIPTION OF THE DRAWINGS

The above and other objects, aspects, features and advantages of the present invention will become more apparent from the following detail description with reference to the accompanying drawings, in which:

FIG. 10 is a drawing showing a table of laser output upper limits registered in the apparatus of the embodiment;

FIG. 11 is a drawing showing a table of lamp power upper limits registered in the apparatus of the embodiment;

FIG. 18 is a drawing showing an "error message" screen upon the setting entry in the embodiment;

FIG. 19 is a drawing showing an "error message" screen upon the laser interruption in the embodiment;

DESCRIPTION OF THE PREFERRED EMBODIMENTS

Reference will now be made to FIGS. 1 to 21 in order to describe preferred embodiments of the present invention.

Figure 1:
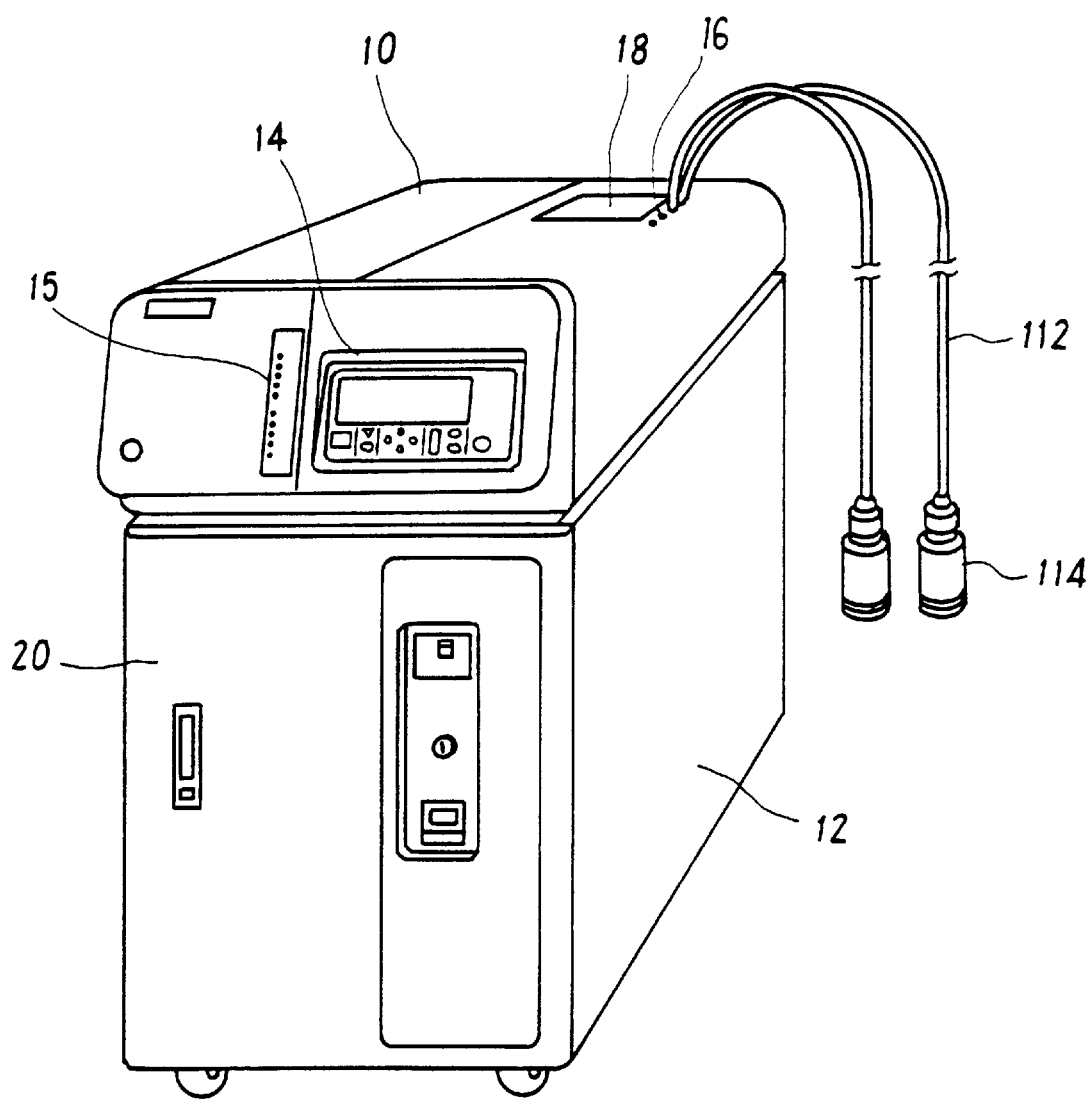
FIG. 1 is a perspective view showing an external appearance of a laser processing apparatus in accordance with an embodiment of the present invention.
Figure 2:
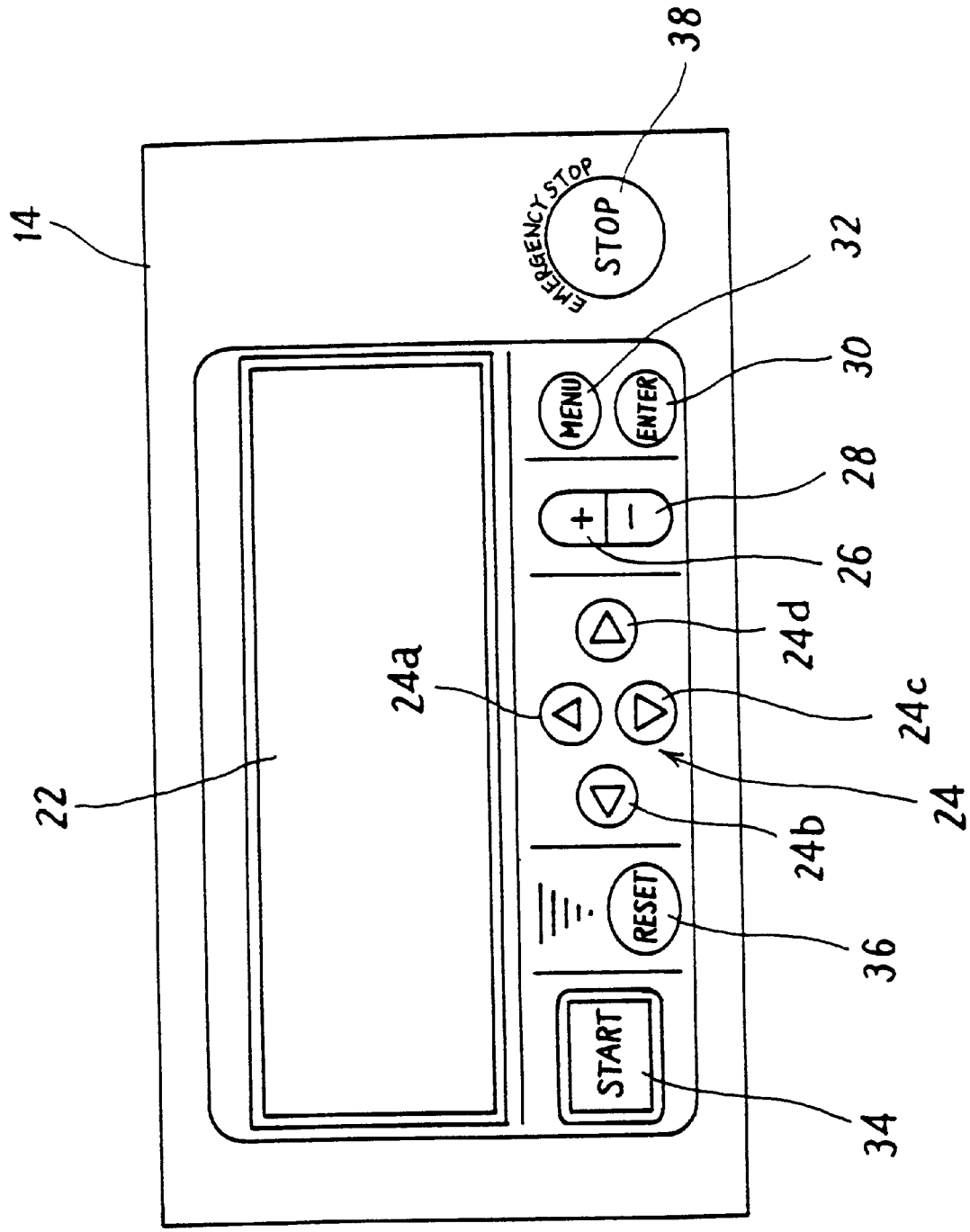
FIG. 2 is a partially enlarged front view showing in an enlarged scale an external appearance of a operation panel of the laser processing apparatus in the embodiment.

Referring first to FIGS. 1 and 2 there is shown an external configuration of a laser processing apparatus in accordance with an embodiment of the present invention. FIG. 1 is a perspective view of the entire apparatus and FIG. 2 is a partially enlarged front view of a operation panel of the apparatus.

In FIG. 1 the laser processing apparatus comprises an upper housing 10 and a lower housing 12 which are integrally combined with each other. The upper housing 10 accommodates therein a laser oscillation unit, a control, a laser branch unit for multi-position processing, etc. On its front surface the upper housing 10 is provided for example with the operation panel designated at 14 which includes various key switches and a display for setting entry/display output of various set values, measured values, etc and with a group of LEDs 15 for lighting display of the state of high-voltage supply, the state of charging completion, etc. On its top surface the upper housing 10 is provided for example with holes (openings) 16 through which there extend a plurality of optical fibers 112 for multi-position processing and with an openable/closable cover 18 for the fiber attachment work.

The lower housing 12 accommodates therein a power part, an external connection terminal and a breaker which constitute a power supply unit, as well as a tank, a pump, a heat exchanger, an ion exchange resin, a filter and an external piping connection port which constitute a cooling unit. The lower housing 12 has a front panel 20 in the form of a hinged door.

As can be seen in FIG. 2 the operation panel 14 has at its central portion a flat panel display, e.g., a liquid crystal display 22, beneath which various function keys 24 to 38 are arranged. In this embodiment the keys include cursor keys 24a to 24d, a plus (+) key 26, a minus (−) key 28, an enter key 30, a menu key 32, a start button 34, a reset button 36 and an emergency stop button 38.

The cursor keys 24a to 24d are keys for moving a cursor in vertical and horizontal directions on a screen. When one of the keys 24a to 24d is pressed, the cursor can move in the direction of the arrow indicated by that key.

The plus (+) key 26 and the minus (−) key 28 are data entry keys for use in, as will be described later, entry of numerical values (decimal numbers) for a numerical item, selection of ON or OFF for an ON/OFF item, selection of LASER OUTPUT, LAMP POWER, or CURRENT for a CONTROL item, selection of SI or GI for a FIBER item, selection of FIX or FLEX for a FIX/FLEX item, and the like.

The enter key 30 is a key for entering display data at a cursor position as established set data. The menu key 32 is a key for selecting a screen mode of the apparatus.

The start button 34 is a key for activating the apparatus to emit a pulsed laser beam. The reset button 36 is used to cancel an "error message" screen (FIGS. 18 and 19) appearing on the display 22 upon the occurrence of any trouble. The emergency stop button 38 is a button which is operated upon the emergency. When this button is pressed, the high voltage is shut off, so that the cooling unit comes to a stop.

Figure 3:
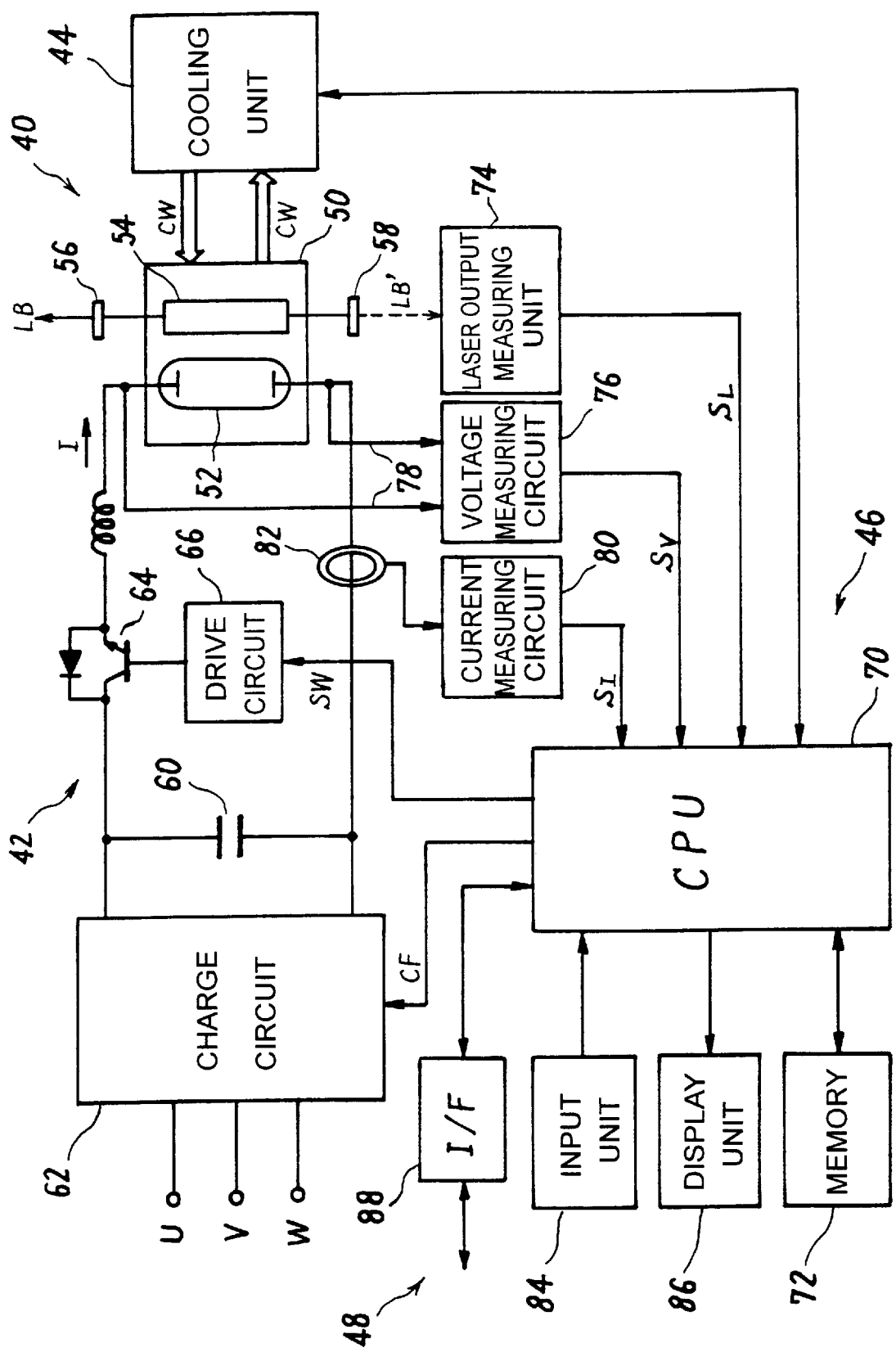
FIG. 3 is a block diagram showing a configuration of the laser processing apparatus in the embodiment.

FIG. 3 is a block diagram showing a configuration of the laser processing apparatus. In this embodiment the laser processing apparatus comprises a laser oscillation unit 40, a laser power supply unit 42, a laser cooling unit 44, a control 46 and an input/output interface unit 48.

The laser oscillation unit 40 includes a light source for excitation, e.g., an excitation lamp 52 and a laser medium, e.g., a YAG rod 54 both of which are arranged within a chamber 50, and a pair of optical resonator mirrors 56 and 58 which are disposed on an optical axis of the YAG rod 54 outside the chamber 50.

When the excitation lamp 52 lights, its optical energy excites the YAG rod 54, so that a light beam leaving along the optical axis the both end surfaces of the YAG rod 54 is reiteratively reflected for amplification between the optical resonator mirrors 56 and 58, after which it passes as a pulsed laser beam LB through the output mirror 56. After passing through the output mirror 56, the pulsed laser beam LB is delivered to the laser branch unit (FIG. 5) which will be described later, in which it is split into a plurality of branch pulsed laser beams.

The laser power supply unit 42 includes a capacitor 60 for storing electric power for laser oscillation to be supplied to the laser oscillation unit 40, a charge circuit 62 for converting a commercial AC, e.g., three-phase AC power supply voltage (U, V, W) into a DC to charge the capacitor 60 to a predetermined DC voltage, a switching element, e.g., a transistor 64 connected between the capacitor 60 and the excitation lamp 52 of the laser oscillation unit 40, and a drive circuit 66 for switching the transistor 64 at a high frequency (e.g., 10 kHz).

The laser cooling unit 44 serves to radiate heat generated by the excitation lamp 52 and the YAG rod 54 of the laser oscillation unit 40 to the outside of the laser oscillation unit 40 and is constructed to supply to the laser oscillation unit 40 a cooling medium, e.g., a cooling water CW whose temperature has been controlled to a predetermined temperature.

The control 46 includes a CPU (microprocessor) 70 for controlling the action of the entire apparatus or of each part, a memory 72 for holding various programs and various set values or computed data for causing the CPU 70 to perform predetermined processing, and a variety of measuring means 74 to 82 for measuring the laser output of the pulsed laser beam LB or electric parameters of the laser power supply unit 42 corresponding thereto.

Among such measuring means, a laser output measuring unit designated at 74 has a photo sensor for receiving a laser beam LB' leaking backward of the optical resonator mirror 58, and a measuring circuit for defining the laser output of the pulsed laser beam LB on the basis of an electric signal output from the photo sensor, with a thus obtained laser output measured value $S_L$ being fed to the CPU 70.

A voltage measuring circuit designated at 76 is electrically connected via voltage sensing lines 78 to both terminals of the excitation lamp 52. The voltage measuring circuit 76 measures in an effective value for example a voltage (lamp voltage) applied by the power supply unit 42 to the excitation lamp 52 and feeds a thus obtained lamp measured value $S_V$ to the CPU 70. A current measuring circuit designated at 80 receives a current detection signal from a current sensor, e.g., a Hall CT 82 attached to a lamp current supply circuit of the power supply unit 42. The current measuring circuit 80 measures in an effective value a current (lamp current) I supplied to the excitation lamp 52 and feeds a thus obtained lamp current measured value $S_I$ to the CPU 70.

For the power supply unit 42 the CPU 70 feeds to the charge circuit 62 a charge control signal CF for charging the capacitor 60 to a set voltage, while simultaneously feeding to the drive circuit 66 a switching control signal SW for waveform control.

In the waveform control of this embodiment, the CPU 70 compares with a preset reference waveform for waveform control the laser output measured value $S_L$ from the laser output measuring unit 74, the lamp voltage measured value $S_V$ from the voltage measuring circuit 76 or the lamp current measured value $S_I$ from the current measuring circuit 80, or a lamp power measured value $S_P$ ($S_V \cdot S_I$) obtained from the lamp voltage measured value $S_V$ and the lamp current measured value $S_I$, to thereby find a comparison error. The CPU 70 then creates a switching control signal SW in the form of e.g., a pulse width control signal so as to nullify the comparison error.

Such a feedback control system provides a control allowing the laser output of the pulsed laser beam LB oscillatorily output from the laser oscillation unit 40 or electric parameters (lamp current, lamp power, lamp voltage) of the laser power supply unit 42 corresponding thereto to conform to their respective reference waveforms for waveform control.

The input/output interface unit 48 includes an input unit 84, a display unit 86 and a communication interface circuit (I/F) 88. The input unit 84 is composed of the key switches of the operation panel 14, and the display unit 86 is composed of the group of LEDs and the display 22 which are arranged on the front surface of the apparatus. The I/F 88 is used for data communication with external apparatuses or units.

Note that the operation panel 14 could be provided as a unit (program unit) which is separable from the apparatus body. In such a case, the program unit is provided with the CPU 70, the memory 72, the input unit 84 and the display unit 86 and is electrically connected via a communication cable to the apparatus body.

Figure 4:
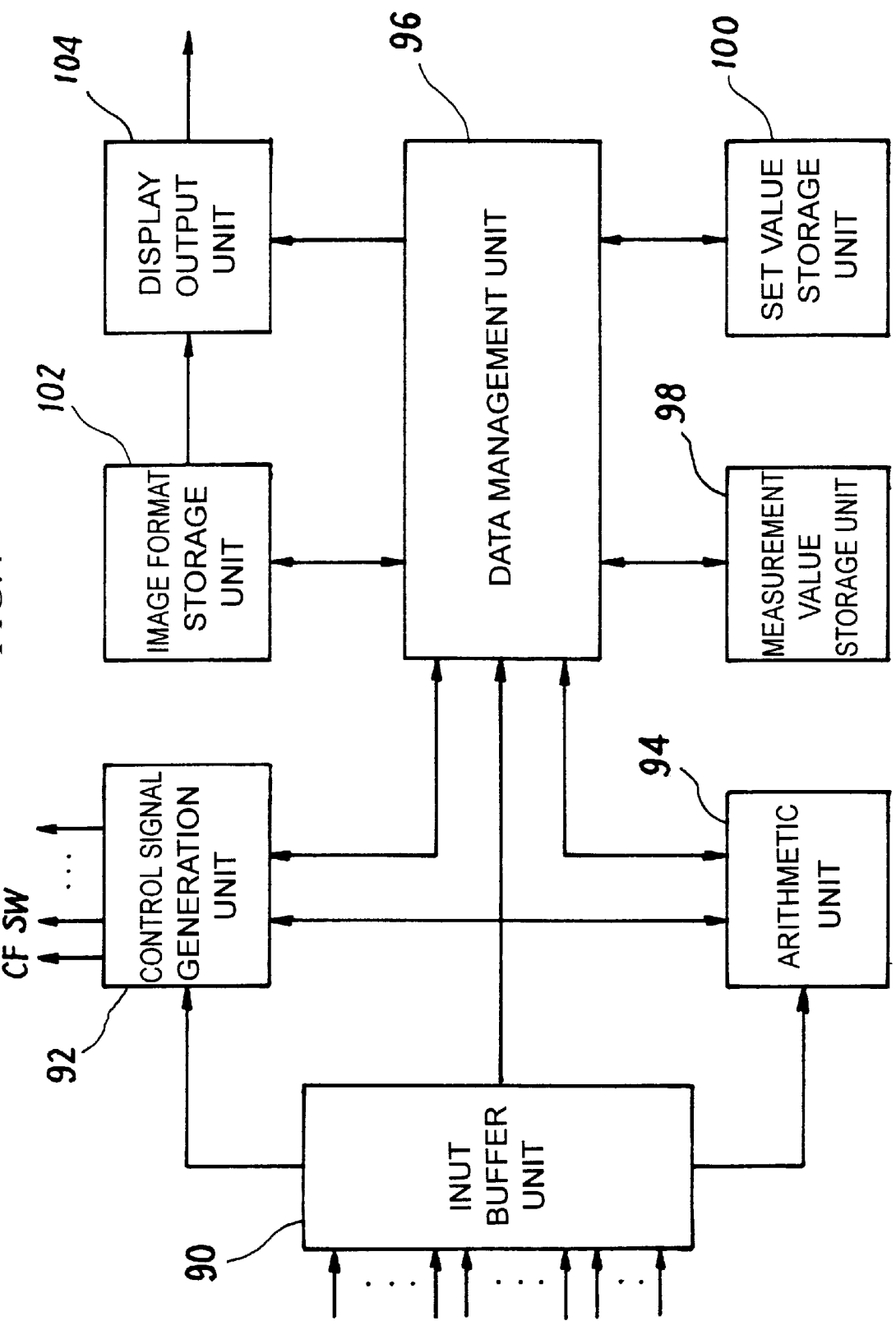
FIG. 4 is a block diagram showing a configuration of functional means implemented by a CPU and a memory of the laser processing apparatus in the embodiment.

FIG. 4 is a block diagram showing a configuration of functional means implemented by the CPU 70 and the memory 72 in this embodiment. As shown the CPU 70 and the memory 72 implement an input buffer unit 90, a control signal generation unit 92, an arithmetic unit 94, a data management unit 96, a measured value storage unit 98, a set value storage unit 100, an image format storage unit 102 and a display output unit 104.

The input buffer unit 90 fetches and temporarily holds data input to the CPU 70, for example, set data from the input unit 84, external data from the communication interface circuit 88, and measured value data from the cooling unit 44 or from the measuring circuits 74, 76 and 80.

The arithmetic unit 94 executes all arithmetic processing which the CPU 70 needs to do. The control signal generation unit 92 generates all control signals which the CPU 70 imparts to the exterior. The data management unit 96 manages all saves and moves of data within the CPU 70 and memory 72.

The measured value storage unit 98 holds measured value data input to the CPU 70, and the set value storage unit 100 holds set value data input to the CPU 70 or set value data obtained by arithmetic within the CPU 70.

The image format storage unit 102 stores therein image data indicative of images of a formatted portion whose display content is fixed among various images appearing on the display 22. The display output unit 104 superimposes images of variables such as set values from the data management unit 96 on the formatted image fed by the image format storage unit 102, to make a combined screen so that image data of the combined screen are output to the display unit 86.

Figure 5:
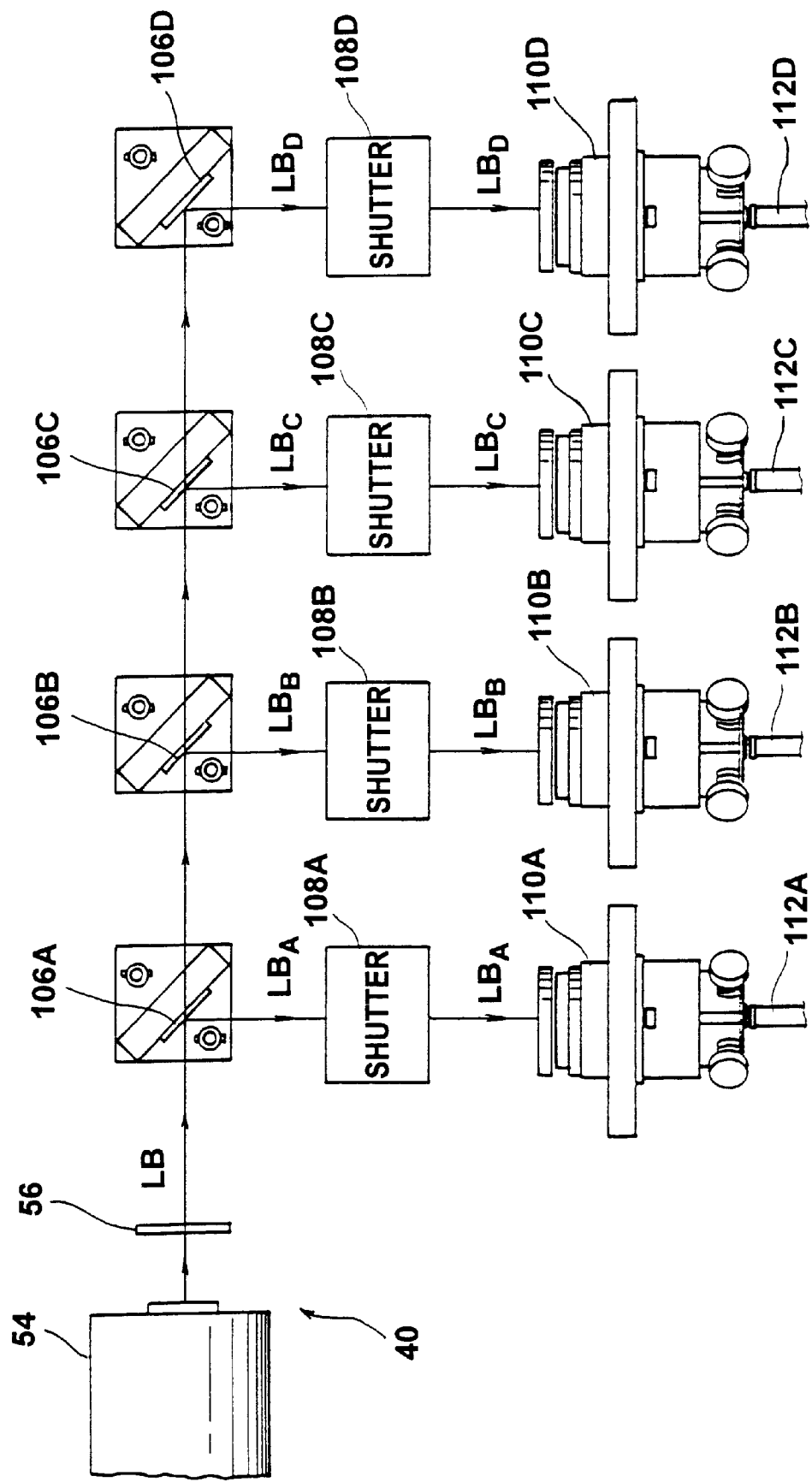
FIG. 5 is a plan view showing a configuration of a laser branch unit in the apparatus of the embodiment.

FIG. 5 illustrates an example of a configuration of the laser branch unit. This laser branch unit allows a selection of any of one to four branch and is provided with four sets (A to D) of branch optical systems each consisting of a half mirror or total reflection mirror 106, a shutter 108 and an input unit 110.

In the four-branch mode for example, the pulsed laser beam LB oscillatorily output from the laser oscillation unit 40 as described above is uniformly split into four 25% branch pulsed laser beams $LB_A$, $LB_B$, $LB_C$ and $LB_D$ by the three half mirrors 106A, 106B and 106C. The fourth mirror 106D is a total reflection mirror.

These branch pulsed laser beams $LB_A$ to $LB_D$ pass through the shutters 108A to 108D, respectively, and are injected simultaneously into the input units 110A to 110D, respectively, within which they are condensed by a condenser lens to strike simultaneously on one end surfaces of the optical fibers 112A to 112D, respectively.

The shutters 108A to 108D serve to selectively or independently shut out each branch laser beam $LB_A$ to $LB_D$ as needed. As long as the shutters 108A to 108D are open, the branch laser beams $LB_A$ to $LB_D$ can pass therethrough intactly without being attenuated thereat.

Figure 6:
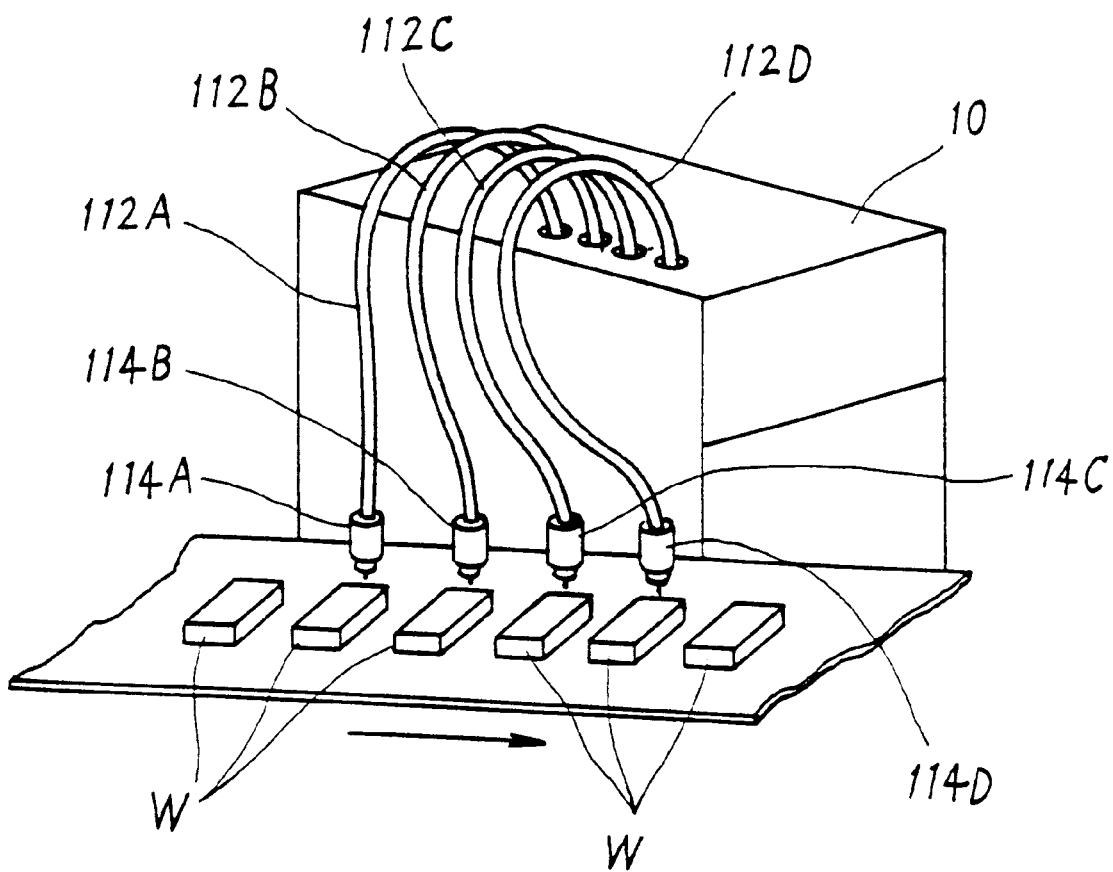
FIG. 6 is a perspective view showing a multi-position processing in accordance with the apparatus of the embodiment.

After having impinged on the one end surfaces of the optical fibers 112A to 112D as described above, the branch laser beams $LB_A$ to $LB_D$ are transmitted through the interior of the optical fibers 112A to 112D to output units 114A to 114D, respectively, as shown in FIG. 6, from which they are simultaneously irradiated and focused on their respective workpieces W.

Referring then to FIGS. 7 to 21 description is made of the screen entries and display functions in the laser processing apparatus of this embodiment.

Figure 7:
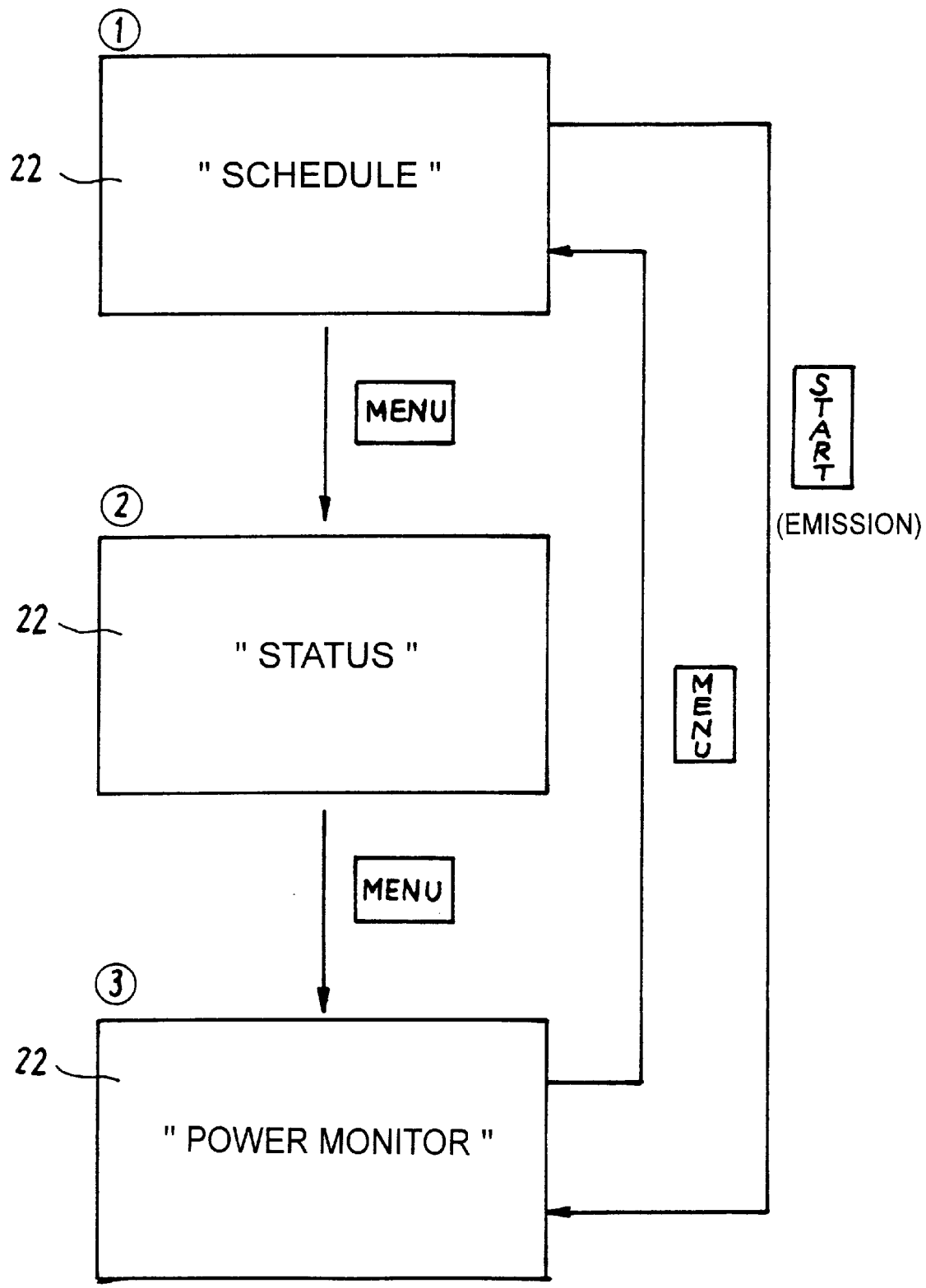
FIG. 7 is a diagram showing major screens displayed by the apparatus of the embodiment as well as a relationship of their mutual switching.

FIG. 7 illustrates major screens appearing on the display 22 in this embodiment as well as relationships of mutual switching of the screens.

This embodiment has three major screens, that is, a "schedule" screen ① for setting and displaying by schedule various conditions on the pulsed laser beam for laser processing, a "status" screen ② for setting and displaying various conditions of the optical system within the apparatus, and a "power monitor" screen ③ for displaying a laser output measured value of the most recently shot pulsed laser beam LB. These three screens ①, ② and ③ are mutually switchable by the operation of the menu key 32 as shown.

Figures 8, 9:
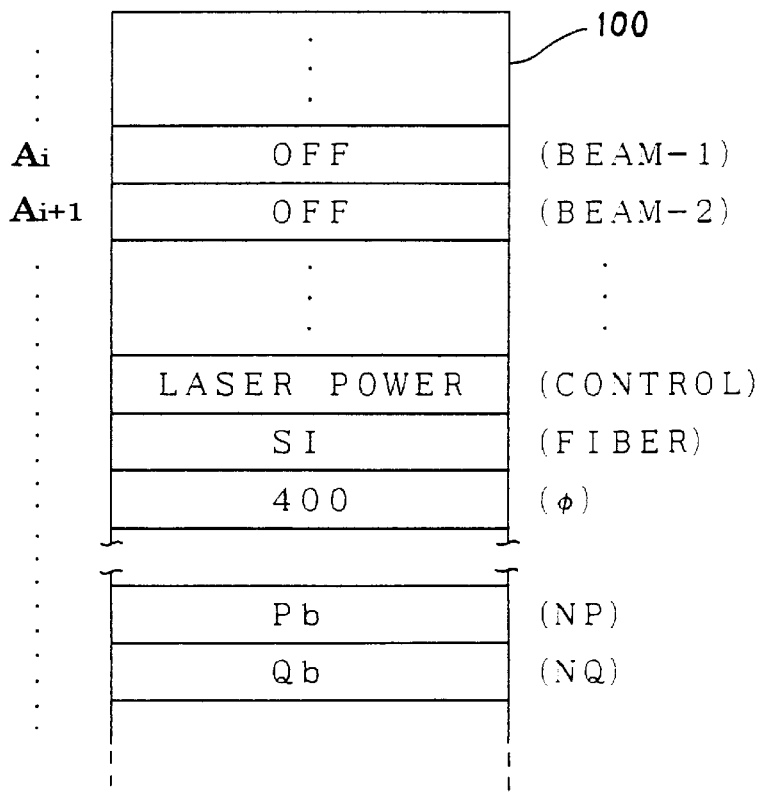
FIG. 8 is a drawing showing an example of display of a "status" screen in the embodiment.
FIG. 9 is a drawing schematically showing an example of storage arrangement of set value data which are set on the "status" screen of the embodiment.
Figure 12:
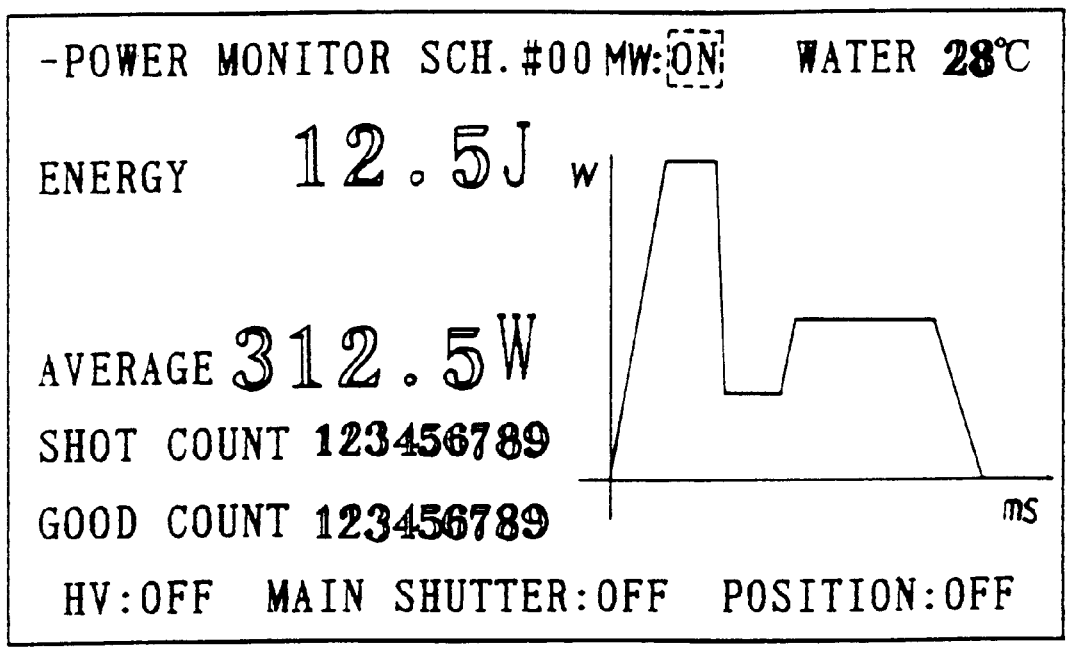
FIG. 12 is a drawing showing an example of display of a "power monitor" screen in the embodiment.
Figure 13:
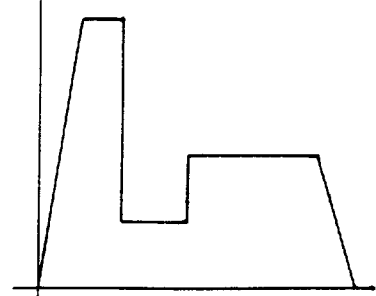
FIG. 13 is a drawing showing an example of display of a "schedule" screen in FIX mode in the embodiment.
Figure 21:
FIG. 21 is a drawing showing an example of display of the "schedule" screen in FLEX mode in the embodiment.
Figure 22:
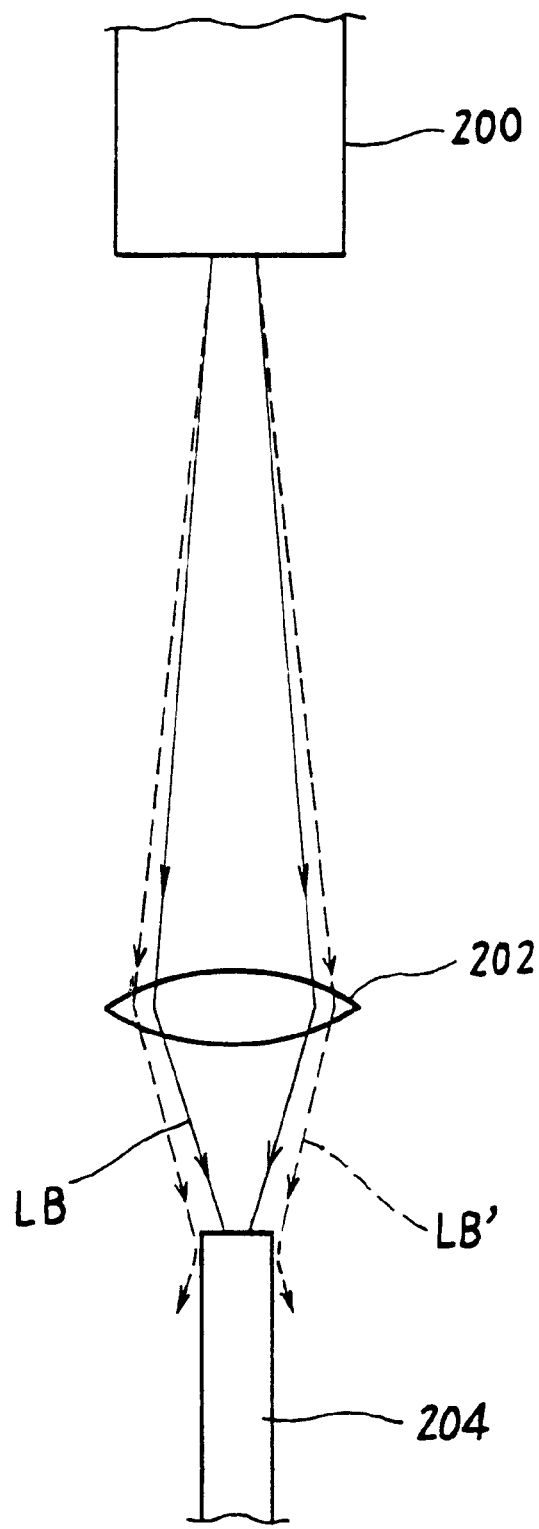
FIG. 22 is a drawing for explaining the problems involved in the prior art.

FIG. 8 illustrates an example of the display content of the "status" screen. In FIG. 8, for easier understanding, items capable of being set and entered on the screen are enclosed by dotted lines. These dotted lines do not appear on the actual screen. Numerical values displayed by hollow letters or bold letters are various measured values and can not be set or altered by the key entry. FIGS. 12, 13 and 21 also employ similar illustrations.

Set and entered on the "status" screen is status information concerning ON/OFF state of the shutters 108A to 108D for a plurality of, e.g., four branch pulsed laser beams $LB_A$ to $LB_D$ (BEAM-1 to BEAM-4) for multi-position processing, feedback parameters (LASER POWER/LAMP POWER/LAMP CURRENT) being presently selected in the laser output waveform control, the type and core diameter ($\phi$) of the optical fibers 112 in use, and the like.

The user operates the cursor key 24 to move the cursor to each item capable of setting entry. The user then operates the plus (+) key 26 or minus (−) key 28 until desired data are displayed, and presses the enter key 30. In response to such key operations, the CPU 70 executes entry display processing and setting processing, and stores the entered set value data at predetermined storage addresses within the set value storage unit 100 as shown in FIG. 9.

In the memory 72 on the other hand, upper limits P of the laser output and supplied power for the type and core diameter of the optical fibers are stored in a table format as shown in FIGS. 10 and 11 for example. Herein, the upper limit P is an upper limit value of the laser output of the laser beam capable of being input to the fiber end surfaces without burning the optical fibers, while the upper limit Q is an upper limit value of the lamp power for the laser output upper limit P, both upper limits being given as mean values per unit time for one optical fiber.

The type of the optical fiber includes a step index (SI) type and a graded index (GI) type. With the same core diameter, the upper limit of the SI type is typically equal to or slightly greater than the upper limit of the GI type.

When data on the type (SI or GI) and the core diameter ($\phi$) of the optical fiber 112 in use are entered on the "status"

screen in such a manner as described hereinabove, the CPU 70 refers to the above table to find the upper limits P and Q corresponding to the type and core diameter of that optical fiber 112. The CPU 70 then multiplies the thus found upper limits P and Q with the number of branches (N) to obtain [NP] and [NQ], which are defined as upper limits for setting for the original pulsed laser beam LB oscillatorily output from the laser oscillation unit 40 and which are stored in predetermined storage addresses within the set value storage unit 100 as shown in FIG. 9.

Herein, the number of branches (N) is the number of branch pulsed laser beams $LB_A$, $LB_B$, . . . , which are obtained by splitting the original pulsed laser beam LB within the laser branch unit, the number of branches (N) depending on the number (N−1) of the half mirrors used. The number of branches (N) does not necessarily coincide with the number of branch pulsed laser beams to be actually transmitted by the optical fibers.

In case of FIG. 5 for example, the number of branches N is four, and four branch pulsed laser beams $LB_A$, $LB_B$, $LB_C$ and $LB_D$ are obtained. If only two (e.g., $LB_C$ and $LB_D$) of them are input to the optical fibers 112C and 112D with the remainders ($LB_A$ and $LB_B$) being shut out by the shutters 108A and 108B, simultaneous two-branch mode results but the number of branches N remains four. However, if the simultaneous two-branch mode similar to the above is achieved with the exclusion of the half mirrors 106A and 106B, the number of branches N results in two since the original pulsed laser beam LB is only once split (into two) by a single half mirror 106C.

FIG. 12 shows an example of the display content of the "power monitor" screen. As shown, on the "power monitor" screen there appear e.g., measured values of the energy (J) and average power (W) of the most recently shot pulsed laser beam LB.

Referring to FIGS. 13 to 17 description is made of functions and operations of the apparatus concerning the "schedule" screen.

Figure 14:
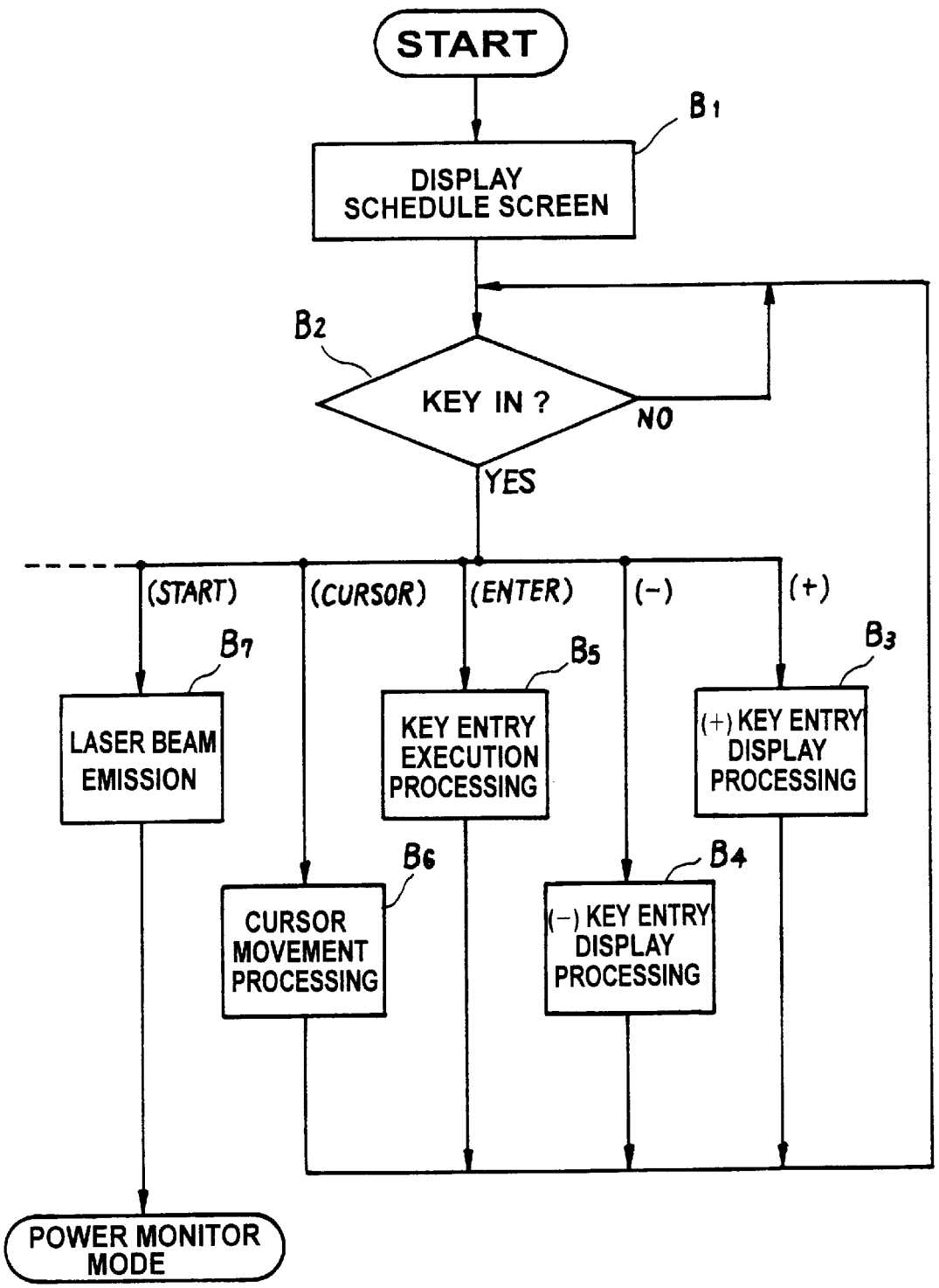
FIG. 14 is a flaw chart showing a main processing procedure executed by the CPU in the schedule mode of the embodiment.
Figure 15:
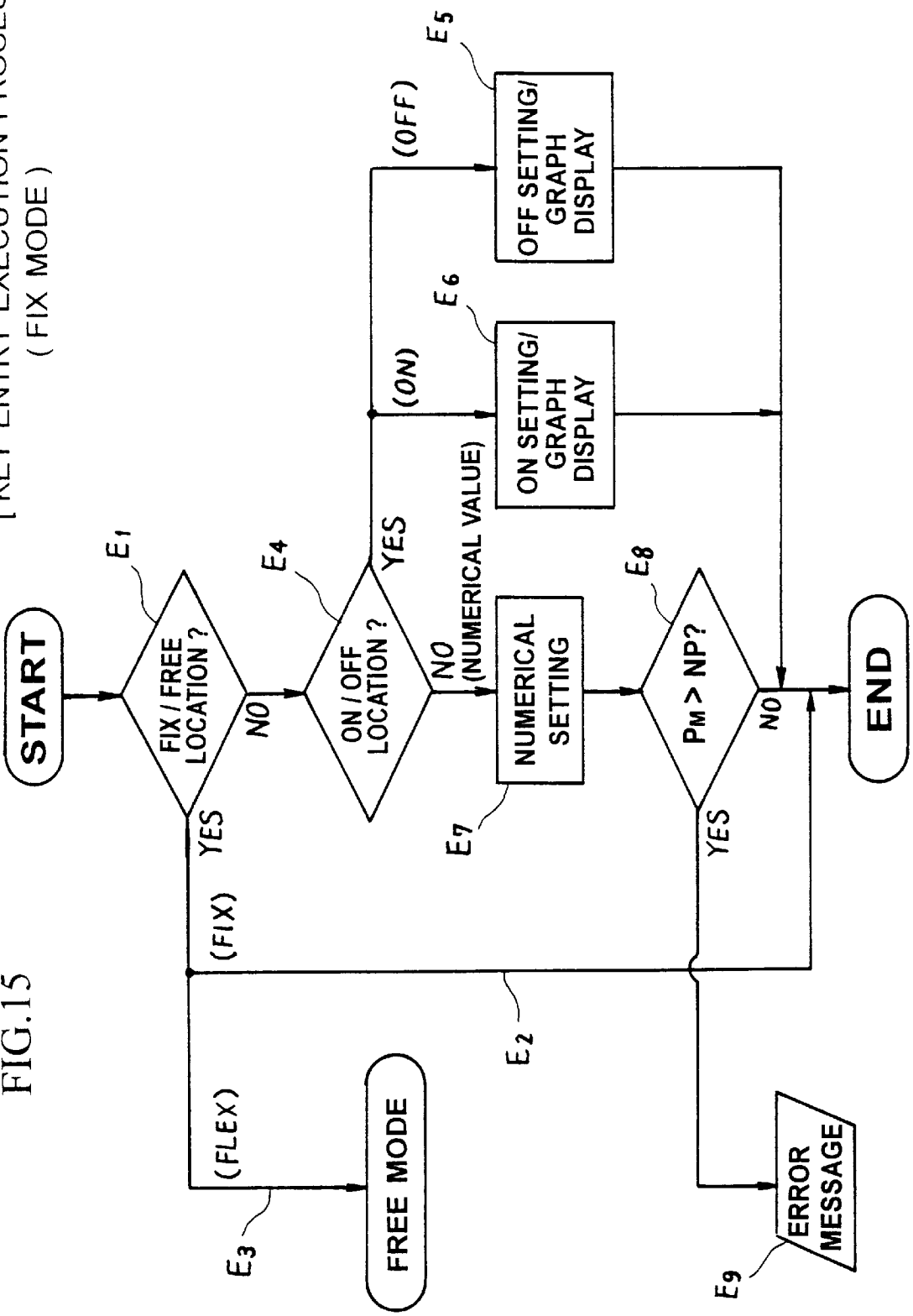
FIG. 15 is a flaw chart showing a procedure of key entry execution processing in the schedule mode (FIX mode) of the embodiment.

FIG. 13 shows an example of the display content of the "schedule" screen. FIG. 14 shows the main processing procedure executed by the CPU 70 in the "schedule" screen mode. FIG. 15 shows the procedure of the key entry execution processing (FIX mode) of the main processing.

The "schedule" screen of this embodiment includes two setting screen modes, that is, the FIX mode as shown in FIG. 13 and the FLEX mode as shown in FIG. 21.

When the menu key 32 is pressed with the "power monitor" screen displayed as described above, the CPU 70 enters the schedule mode as shown in FIG. 14.

Once entering the schedule mode, the CPU 70 first provides on the display 22 the "schedule" screen which was displayed immediately before the completion of the last schedule mode (step B1). On this "schedule" screen displayed the user can perform the entry of desired set values and instruction of action to the apparatus by the key entry using the key buttons 24 to 38 on the operation panel 14 (step B2).

More specifically, the cursor is moved to a data entry position for each item (step B6), and the plus (+) key 26 or the minus (−) key is operated until desired numerical values are reached (steps B3 and B4), after which the enter key 30 is pressed.

In response to the key entry of the enter key 30, the CPU 70 executes key entry execution processing in compliance with the kind of the entry display data at that data entry position indicated by the cursor (step B2). FIG. 15 shows detailed procedure of the key entry execution processing (step B2).

In the FIX mode, to set and enter the reference waveform for waveform control, desired numerical data are set and entered into items including a laser output reference value PEAK, and waveform elements ↑ TSLOPE, FLASH1, FLASH2, FLASH3, and ↓ SLOPE.

Any laser output value can be set and entered in kW unit into the laser output reference value PEAK of these items. Usually, however, selection may be made of a value (e.g., 10, 20, 50, 100, 1000, etc.) which is suitable for the reference of the ratio arithmetic and which is in the vicinity of the maximum value of the laser output desired to be impart to the pulsed laser beam LB to be shot at that schedule No.

Time is only set and entered for the rise period ↑ SLOPE and the fall period ↓ SLOPE. For the flash periods FLASH1, FLASH2 and FLASH3 there are set and entered a laser output value for each period in the form of a value of ratio relative to the laser output reference value PEAK as well as time of each period.

Although the time and the laser output ratio for each period could be set to any arbitrary values, a certain limit may be provided within a settable range in view of the actual applications. For example, the time (pulse width) of the entire waveform can be 0.05 (ms) to 30.0 (ms), with respective ratios of 0 (%) to 200 (%).

Figure 16:
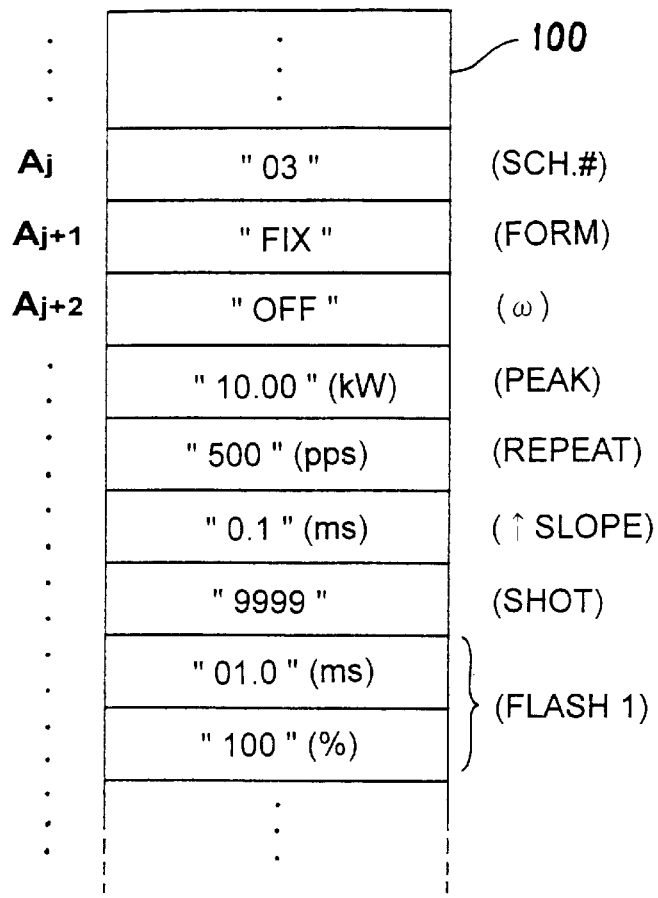
FIG. 16 is a drawing schematically showing an example of storage arrangement of set value data in the FIX mode of the embodiment.

Numerical values are entered into each item for setting the reference waveform. The user moves the cursor to a data entry position for each item and acts on the plus (+) key 26 or the minus (−) key 28 until desired numerical values are reached. Then the user presses the enter key 30. In response to such key operations, the CPU 70 executes the numerical value entry display processing (steps B3 and B4) and setting processing (step B5), after which it stores the entered set value data at predetermined storage addresses within the set value storage unit 100 (FIG. 16).

In the setting example shown in FIG. 13 the laser output reference value PEAK is set to 10.0 (kW), with the laser output ratios of the flash periods FLASH1, FLASH2 and FLASH3 being set respectively to 100.0 (%), 25.0 (%) and 50.0 (%). In terms of kW-converted values the laser output values (kW) of the flash periods FLASH1, FLASH2 and FLASH3 are set respectively to 10.0 (kW), 2.5 (kW) and 5.0 (kW).

In the numerical value setting processing (step E7) for waveform element items as described above, the CPU 70 creates a reference waveform for waveform control as well as a reference waveform graph for display.

Figure 17:
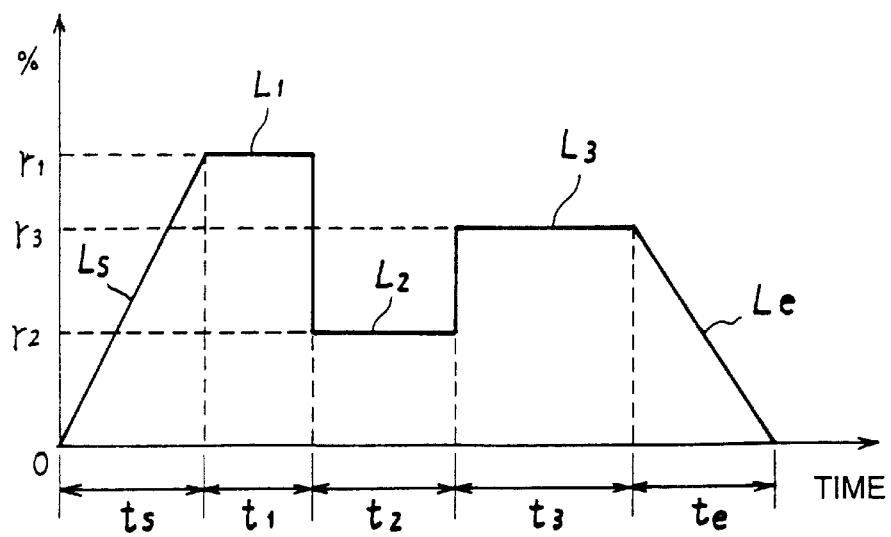
FIG. 17 is a drawing showing an example of a waveform format of a reference waveform in the FIX mode of the embodiment.

As shown in FIG. 17 the reference waveform in FIX mode consists of an upslope waveform section $L_S$ corresponding to the rise period ↑ SLOPE, first, second and third flat waveform sections $L_1$, $L_2$ and $L_3$ corresponding respectively to the first flash period FLASH1, the second flash period FLASH2 and the third flash period FLASH3, and a downslope waveform section $L_e$ corresponding to the fall period ↓ SLOPE.

Accordingly as set values for waveform element items are entered starting from ↑ SLOPE and in the order of FLASH1, FLASH2, . . . , the waveform sections $L_S$, $L_1$, $L_2$, . . . of the reference waveform are defined in sequence. Then on the screen there can appear a reference waveform graph in mid course of creation.

The thus obtained reference waveform graph data are stored in a predetermined storage area of the set value storage unit 100.

The original reference waveform for waveform control is obtained by multiplying (converting) the laser output ratio (r) of each section of the thus created reference waveform graph by the laser output reference value PEAK.

Reference waveform data indicative of the reference waveform for waveform control are also stored in a predetermined storage area of the set value storage unit 100. Then, when the pulsed laser beam LB is shot, the CPU 70 uses the reference waveform data for waveform control as the reference values for feedback waveform control in functioning the control signal generation unit 92 or the arithmetic unit 94.

On the "schedule" screen there are carried out not merely the setting entry of the reference waveform as described above but also the setting entry of a repetition frequency REPEAT and a shot count SHOT of the pulsed laser beam LB. As used herein, the shot count is the total number of a series of pulsed laser beams LB shot in response to a single start signal.

The user operates the cursor key 24 to move the cursor to items of REPEAT and SHOT (step B6). The user then acts on the plus (+) key 26 or the minus (−) key 28 until desired numerical values appear (steps B3 and B4), and presses the enter key 30. In response to such key operations, the CPU 70 executes numerical value entry display processing (steps B3 and B4) and setting processing (step B5), then stores the set value data at predetermined storage addresses within the set value storage unit 100 (FIG. 16).

In this embodiment, each time the numerical value setting processing (step E7) is carried out for setting desired numerical data into the items of the waveform elements ↑ SLOPE, FLASH1, . . . of the reference waveform and of the repetition frequency REPEAT on the "schedule" screen as described above, it is judged whether the set laser output mean value $P_M$ obtained at that time exceeds the upper limit [PN] (step E8).

In this judgment processing (step E8), a laser energy per pulse defined for part or whole of the reference waveform is calculated from the set values of the present reference waveform elements | SLOPE, FLASH1 FLASH2, . . . REPEAT, the resultant laser energy arithmetic value being multiplied by the set value of the present repetition frequency REPEAT to obtain an energy per unit time, i.e., a laser output mean value $P_M$.

This set laser output mean value $P_M$ is then compared with the upper limit PN which has been registered in the set value storage unit 100, to make a judgment on the relationship of magnitude between the two. If $P_M \leq PN$, it is judged to be "normal", in other words, that the present reference waveform set value and repetition frequency set value are effective, allowing those set values to be held intactly in the set value storage unit 100. On the contrary, if $P_M > PN$, it is judged to be "abnormal", in other words, that the present reference waveform set value and repetition frequency set value are ineffective, rejecting the setting (set value) while simultaneously providing a warning screen, e.g., an error message screen as shown in FIG. 18 (step E9).

When the reset button 36 is pressed, the "error message" screen is cancelled, allowing a return to the original schedule screen (FIG. 13). On the thus restored schedule screen there remain intactly the set values which were displayed immediately before the switching to the "error message". Due to the recognition that with respect to the set values of this display content the set laser output mean value $P_M$ would exceed the set upper limit PN, the user can reduce the reference waveform set values or the repetition frequency set values to proper values to pass the judgment criterion.

Description will then be made of operative function during the laser oscillating actions in this laser processing apparatus.

When the start button 34 is pressed in the schedule mode as described above (step B7) or when a start signal is fed via the I/F 88 from an external apparatus not shown, the CPU 70 starts the emission of the pulsed laser beams LB. Incidentally, the start signal from the external apparatus provides a designation of the schedule number as well as an instruction on the start of the laser emission.

In the CPU 70 the data management unit 96 first reads set values of various conditions or items associated with the currently selected schedule number and various set values of the status information from the predetermined storage locations within the set value storage unit 100, to set them at predetermined registers, counters and the like of each part.

Then, in accordance with the feedback control system designated by the "status" screen, the input buffer unit 90, the control signal generation unit 92, the arithmetic unit 94, etc., generate a switching control signal SW for laser output waveform control at a predetermined high frequency, to provide a switching control via the drive circuit 66 to the transistor 64.

Figure 20:
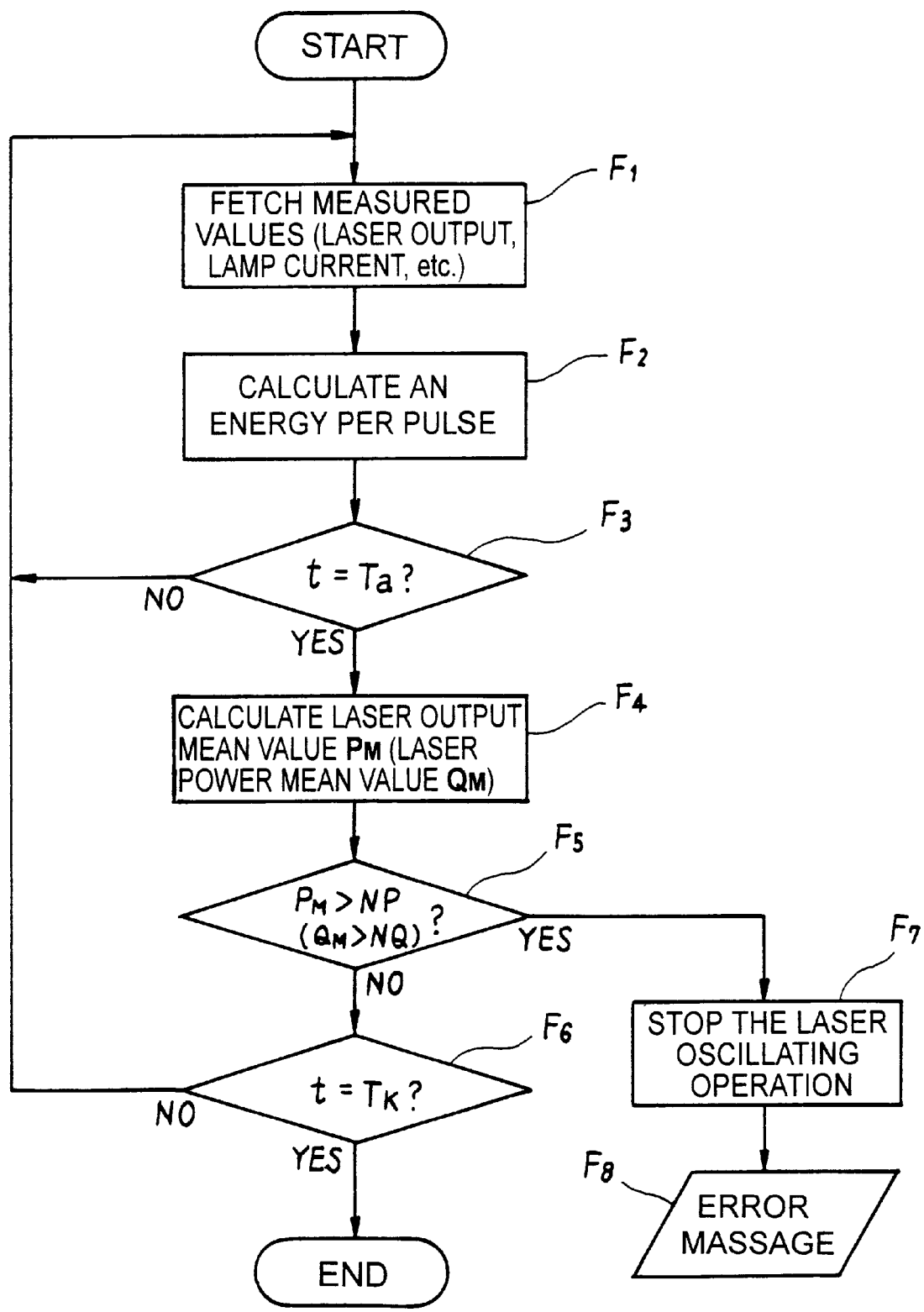
FIG. 20 is a flaw chart showing a procedure of monitoring processing during the laser oscillating action in the embodiment.

In parallel with such a waveform control, the CPU 70 allows the arithmetic unit 94, the data management unit 96, the measurement value storage unit 98, etc., to execute monitoring for the laser output mean value or the lamp power mean value in the procedure as shown in FIG. 20.

In this monitoring, for the duration when the laser oscillation unit 40 oscillatorily shoots the pulsed laser beam LB, the CPU 70 fetches a laser output measured value $S_L$ from the laser output measuring unit 74, a lamp voltage measured value $S_V$ from the voltage measuring circuit 76, and a lamp current measured value $S_I$ from the current measuring circuit 80 (step F1), and finds an energy per pulse on the basis of time integral value of the laser output measured value $S_L$ or the lamp power ($S_V \cdot S_I$) (step F2).

Then, at intervals of a certain time $T_a$, e.g., 1 sec. (step F3), the laser output mean value $P_M$ or the lamp power mean value $Q_M$ is figured out from the cumulative value of the energy per pulse (step F4).

Then, the thus obtained laser output mean value $P_M$ or the lamp power mean value $Q_M$ is compared with the set upper limit PN or QN to judge the relationship of magnitude between the two (step F5).

If $P_M \leq PN$ or $Q_M \leq QN$ as a result of this comparison, it is judged to be "normal", in other words, that the laser output mean value of the pulsed laser beam LB per unit time at the present time or the lamp power mean value lies within the safety range for the optical fiber 112 in use, allowing the switching control in the power supply unit 42 or the laser oscillating actions in the oscillation unit 40 to continue as it is.

On the contrary, if $P_M > PN$ or $Q_M > QN$, it is judged to be "abnormal", in other words, that the laser output mean value of the pulsed laser beam LB per unit time at the present time or the lamp power mean value is too high and risky for the optical fiber 112 in use, interrupting the feed of the switching signal SW to stop the action of the power supply unit 42 and the oscillation unit 40 (step F7). Then, on the screen of the display 22 there appears an error message as shown in FIG. 19 for example (step F8).

It would also be possible to shutout the branch pulsed laser beams $LB_A$, $LB_B$, . . . by closing the shutters 108 within the laser branch unit, instead of stopping the action of the power supply unit 42 and the oscillation unit 40.

Even though it is normal, if the interruption time of the pulsed laser beam LB exceeds a certain period to time $T_K$, this monitoring is once terminated (step F6). Then, when the pulsed laser beam LB is next shot, the monitoring is newly started.

Accordingly, even though one schedule is complete, this monitoring continues unless the interruption time exceeds the above certain period of time $T_K$.

Even though the set values of the reference waveform and repetition frequency on the "schedule" screen as described above do not exceed the set upper limits, if a schedule having less shot count is executed at a short interval in response to an external start signal which is fed at any arbitrary timing, the actual laser output mean value $P_M$ or the lamp power mean value $Q_M$ may possibly exceed the set upper limit PN or QN. In such a case, this monitoring functions in an effective manner.

Thus, in this embodiment, upon the setting entry the laser output mean value per unit time is figured out from the set value of the reference waveform for waveform control and from the set value of the pulse repetition frequency, the resultant laser output mean value being compared with the set laser output upper limit corresponding to the optical fiber in use (in setting). In response to the comparison result, the validity of the set value of the reference waveform or the validity of the set value of the repetition frequency is judged, and if the invalidity has been judged, the setting is prohibited while simultaneously issuing and displaying an error message to require the user to change (alter) the set values.

By virtue of this, the user can enter desired set values in relief without needing any excess time or attentions with respect to the protection of the optical fiber 112.

Furthermore, in this embodiment, during the repeated shot of the pulsed laser beams, a laser output mean value or a lamp power mean value is figured out at a certain interval, the resultant laser output mean value or the lamp power mean value being compared with the set laser output upper limit corresponding to the optical fiber in use. When the former (mean value) exceeds the latter (upper limit), the laser oscillation action is stopped immediately.

By virtue of this, the activation can be applied at any timing by the external apparatus, and even though the actual laser output mean value or the lamp power mean value has exceeded the set laser output upper limit, the burning of the optical fibers can securely be prevented.

Furthermore, the prevention of the burning of the optical fibers will contribute to a higher yield of the laser processing and an improved process quality.

It is to be appreciated that the laser output mean value $P_M$ or the lamp power mean value $Q_M$ could also be obtained as a moving average.

Furthermore, although this embodiment stopped the laser oscillating action as measures upon the abnormality through the monitoring, it would also be possible to allow the laser oscillation action to continue by appropriately correcting the set values or the like of the reference waveform or the repetition frequency. Alternatively, it would also be feasible to provide a proper feedback control so that the actual laser output mean value $P_M$ or lamp power mean value $Q_M$ does not exceed the set upper limit PN or QN.

FIG. 21 shows an example of display of the "schedule" screen in FLEX mode. In the FLEX mode, to set and enter the reference waveform for waveform control, as shown in FIG. 21, there are set a time t and a laser output ratio r for items of a plurality of waveform passage points POINT1, POINT2, POINT3, POINT4, ... , in addition to the setting of the laser output reference value PEAK.

The number of the settable waveform passage points POINT can be considerable number, for example, of the order of 20. Although the screen can have only five points at a time, the screen scroll system ensures a viewing of all the waveform passage points. When it is desired to scroll the screen downward, the cursor is moved to the location of ▼ and the downward movement cursor key 24c is pressed. On the contrary, when it is desired to scroll the screen upward, the cursor is moved to the location of ▲ and the upward movement cursor key 24a is pressed. The apparatus side executes the screen scroll in the cursor movement processing (step B6).

In the FLEX mode as well, desired numerical values are entered into the items of the waveform elements POINT1, POINT2, ... of the reference waveform, the pulse repetition frequency REPEAT, etc. The user moves the cursor to a data entry location for each item, and acts on the plus (+) key or the minus (–) key until a desired numerical value is displayed, and then presses the enter key 30. In response to the key operations, the CPU 70 executes the numerical value entry display and the setting processing similar to the case of FIX mode described above, and stores the entered set value data at predetermined storage addresses within the set value storage unit 100.

On the coordinates with X-axis representing time and with Y-axis representing % values, the reference waveform in the FLEX mode is defined as a line graph joining points of a plurality of waveform passage points POINT1, POINT2, ... which have been set and entered.

Also in the case of the key entry execution processing in the FLEX mode, immediately after the setting of numerical values (step E7) judgment is made of the laser output mean value or the lamp power mean value (step E8) in the same manner as the case of FIX mode.

Although preferred embodiments have been described and illustrated hereinabove, the present invention is not intended to be limited to the above embodiments but it is possible to variously change and modify the present invention within the scope of its technical idea.

For example, in the above embodiments, the reference waveform (diagram) for laser output waveform control was set on the setting mode screen ("schedule" screen), and the laser output set value was acquired on the basis of that reference waveform. In the case of the rectangular wave pulsed laser beam, however, it would also be possible to acquire the laser output set value from e.g., the set values of the pulse width, peak value and repetition frequency, with no particular need to set the reference waveform (diagram).

A mouse, a tablet or the like could also be used as the set value entry means. The excitation lamp could also be replaced by a semiconductor laser or the like as the excitation means in the laser oscillation unit.

The above multi-position processing system is a mere example, so that the laser beam from the laser oscillation unit may impinge directly on the optical fiber without being branched. Although the above embodiments were related to the pulsed laser processing apparatus, the present invention would be applicable to a continuous oscillation CW laser processing apparatus or a laser processing apparatus without any waveform control features.

What is claimed is:

1. A laser processing apparatus in which a laser beam oscillatorily output from a laser oscillation unit is transmitted through an optical fiber to a remote laser processing site, said laser processing apparatus comprising:

optical fiber setting means for setting the type and diameter of said optical fiber;

laser output upper limit finding means for finding a laser output upper limit of said laser beam depending on the type and diameter of said optical fiber which have been set by said optical fiber setting means;

laser output setting means for setting a laser output of said laser beam; and judgment means for comparing said laser output value which has been set by said laser output setting means with said laser output upper limit which has been found by said laser output upper limit finding means, to judge whether said laser output set value exceeds said laser output upper limit.

2. A laser processing apparatus according to claim 1, wherein said laser output upper limit finding means include storage means for storing in a table format the type and diameter of a plurality of optical fibers usable for said apparatus, and laser output upper limits corresponding to each type and diameter.

3. A laser processing apparatus according to claim 2, further comprising warning means for generating a warning when said judgment means judge that said laser output set value exceeds said laser output upper limit.

4. A laser processing apparatus according to claim 3, further comprising means which prohibit the setting in said laser output setting means when said judgment means judge that said laser output set value exceeds said laser output upper limit.

5. A laser processing apparatus according to claim 2, further comprising means which prohibit the setting in said laser output setting means when said judgment means judge that said laser output set value exceeds said laser output upper limit.

6. A laser processing apparatus according to claim 1, wherein said laser output setting means include:

reference waveform setting means for setting a reference waveform for laser output reference waveform with respect to said laser beam generated as a pulsed laser beam;

repetition frequency setting means for setting a repetition frequency with respect to said laser beam; and laser output mean value arithmetic means for figuring out as said laser output set value a laser output mean value of said pulsed laser beam per a certain time on the basis of said reference waveform which has been set and of said repetition frequency which has been set.

7. A laser processing apparatus according to claim 6, further comprising warning means for generating a warning when said judgment means judge that said laser output set value exceeds said laser output upper limit.

8. A laser processing apparatus according to claim 7, further comprising means which prohibit the setting in said laser output setting means when said judgment means judge that said laser output set value exceeds said laser output upper limit.

9. A laser processing apparatus according to claim 6, further comprising means which prohibit the setting in said laser output setting means when said judgment means judge that said laser output set value exceeds said laser output upper limit.

10. A laser processing apparatus according to claim 1, wherein said laser output setting means include laser output set value arithmetic means for figuring out said laser output set value on the basis of a pulse width, a peak output value and a repetition frequency of said laser beam which has been generated as a pulsed laser beam.

11. A laser processing apparatus according to claim 10, further comprising means which prohibit the setting in said laser output setting means when said judgment means judge that said laser output set value exceeds said laser output upper limit.

12. A laser processing apparatus according to claim 10, further comprising warning means for generating a warning when said judgment means judge that said laser output set value exceeds said laser output upper limit.

13. A laser processing apparatus according to claim 12, further comprising means which prohibit the setting in said laser output setting means when said judgment means judge that said laser output set value exceeds said laser output upper limit.

14. A laser processing apparatus according to claim 1, further comprising warning means for generating a warning when said judgment means judge that said laser output set value exceeds said laser output upper limit.

15. A laser processing apparatus according to claim 14, further comprising means which prohibit the setting in said laser output setting means when said judgment means judge that said laser output set value exceeds said laser output upper limit.

16. A laser processing apparatus according to claim 1, further comprising means which prohibit the setting in said laser output setting means when said judgment means judge that said laser output set value exceeds said laser output upper limit.

17. A laser processing apparatus in which a laser beam oscillatorily output from a laser oscillation unit is transmitted through an optical fiber to a remote laser processing site, said laser processing apparatus comprising:

laser output upper limit finding means for finding a laser output upper limit of said laser beam depending on the type and diameter of said optical fiber;

laser output mean value arithmetic means for detecting a laser output of said laser beam oscillatorily output from said laser oscillation unit to figure out a laser output mean value at a certain interval; and interruption means for interrupting an impingement of said laser beam onto said optical fiber when said laser output average value exceeds said laser output upper limit.

18. A laser processing apparatus in which a laser beam oscillatorily output from a laser oscillation unit is transmitted through an optical fiber to a remote laser processing site, said laser processing apparatus comprising:

a laser power supply unit for supplying said laser oscillation unit with an electric power for laser oscillation;

supply power upper limit finding means for finding a supply power upper limit of said laser power supply unit corresponding to said laser output upper limit of said laser beam depending on the type and diameter of said optical fiber;

supply power mean value arithmetic means for detecting a power supplied by said laser power supply unit to said laser oscillation unit to figure out a supply power mean value at a certain interval; and interruption means for interrupting said laser power supply unit when said supply power mean value exceeds said supply power upper limit.

* * * * *